US012623887B1

(12) United States Patent
Umek et al.

(10) Patent No.: US 12,623,887 B1
(45) Date of Patent: May 12, 2026

(54) LOAD WEIGHING LINK MEMBER ON A CRANE ARM

(71) Applicant: TAJFUN PLANINA PROIZVODNJA STROJEV, D.O.O., Planina pri Sevnici (SI)

(72) Inventors: Anton Umek, Trzic (SI); Boris Jerman, Radomlje (SI); Mitja Gliha, Trebnje (SI); Matej Petek, Podplat (SI); Iztok Span, Ljubljana (SI)

(73) Assignee: TAJFUN PLANINA PROIZVODNJA STROJEV D.O.O., Planina pri Sevnici (SI)

( * ) Notice: Subject to any disclaimer, the term of this patent is extended or adjusted under 35 U.S.C. 154(b) by 258 days.

(21) Appl. No.: 18/685,804

(22) PCT Filed: Jul. 25, 2022

(86) PCT No.: PCT/SI2022/000004
§ 371 (c)(1),
(2) Date: Feb. 22, 2024

(87) PCT Pub. No.: WO2023/033747
PCT Pub. Date: Mar. 9, 2023

(30) Foreign Application Priority Data

Sep. 1, 2021 (SI) ................................. P-202100165

(51) Int. Cl.
*B66C 13/16* (2006.01)
*B66C 1/68* (2006.01)
(Continued)

(52) U.S. Cl.
CPC ................ *B66C 13/16* (2013.01); *B66C 1/68* (2013.01); *B66C 3/005* (2013.01); *G01G 3/1408* (2013.01)

(58) Field of Classification Search
CPC ........... B66C 1/68; B66C 13/16; B66C 3/005; G01G 19/18; G01G 3/1408; G01L 1/2218
See application file for complete search history.

(56) References Cited

U.S. PATENT DOCUMENTS

| | | | | |
|---|---|---|---|---|
| 9,000,311 | B1 | 4/2015 | Collins | |
| 2015/0323377 | A1* | 11/2015 | Öberg | B66C 3/005 |
| | | | | 177/25.13 |
| 2020/0156905 | A1* | 5/2020 | Umek | B66C 13/16 |

FOREIGN PATENT DOCUMENTS

| | | |
|---|---|---|
| CN | 104016232 B | 9/2014 |
| EP | 1889808 | 2/2008 |

(Continued)

OTHER PUBLICATIONS

International Search Report and Written Opinion dated Oct. 26, 2022 issued in co-pending PCT/SI2022/000004 (10 pages).

*Primary Examiner* — Kristina M Deherrera
*Assistant Examiner* — Gedeon M Kidanu
(74) *Attorney, Agent, or Firm* — Haynes and Boone, LLP; William B. Nash

(57) ABSTRACT

The present disclosure refers to a link member on an arm of a crane, which is pivotable around the horizontal axis (x) connected to said arm of said crane by means of a pivot joint, and is also pivotable around a further horizontal axis (y) perpendicular to the horizontal axis (x), wherein the link member is connected to a grabber furnished with a rotator for controlled rotation of the grabber around the vertical geometric axis (z). The purpose of the present disclosure is to provide accurate weighing of a free hanging load held by the grabber during transportation of the load, wherein said link member is configured to facilitate controlled rotation of the grabber around the substantially vertical geometric axis (z) despite inertial forces, which occur due to the acceleration or deceleration of the load when being rotated around (Continued)

said substantially vertical axis (z). In particular, link member comprises an elastically deformable area arranged between said pivot joints and is deformable depending on stresses to which said link member is subjected, which is caused by the weight of the load. The weight of each load is determined on the basis of deformations within said elastically deformable area of the link member, which are detected by means of suitably arranged sensors.

9 Claims, 5 Drawing Sheets

(51) Int. Cl.
B66C 3/00 (2006.01)
G01G 3/14 (2006.01)

(56) References Cited

FOREIGN PATENT DOCUMENTS

| WO | WO2013/025141 A | 2/2013 |
| WO | WO2014092656 A1 | 6/2014 |
| WO | WO2017/111684 A1 | 6/2017 |
| WO | WO2019/009817 A1 | 1/2019 |

* cited by examiner

LOAD WEIGHING LINK MEMBER ON A CRANE ARM

CROSS-REFERENCE TO RELATED APPLICATIONS

This application is a United States national phase application of co-pending International Patent Application No. PCT/SI2022/000004, filed on 25 Jul. 2022, which claims the benefit of Slovenia Patent Application No. P-202100165 filed 1 Sep. 2021, both of which are hereby incorporated by reference in their entirety.

BACKGROUND

The present disclosure refers to a link member of a crane arm, e.g. of an arm on a mobile hydraulic crane with a telescopic arm, which is mountable on a motor vehicle, wherein the link member is suitable for weighing a load during transportation thereof by means of a grabber, which is attached to said crane arm and which is rotatable around a substantially vertical geometric axis in a controlled manner, together with the load.

Pursuant to the International Patent Classification, the present disclosure belongs to transporting and working operations, namely to cranes, and specifically to technical features of load engaging elements or devices in connection with determining of the weight of the load, and should therefore belong to the IPC-Class B 66 C 13/16.

The present disclosure refers to a link member, which is suitable for attaching to a grabber. This grabber is suitable for manipulating loads by means of a crane arm, wherein said grabber is attached to a crane arm and configured to freely rotate around each one of a set of perpendicular and substantially horizontal geometric axes. The grabber is also able to be rotated around a substantially vertical geometric axis along with the load. The present disclosure enables weighing of the load, when it is held by said grabber, which may be freely hanging on said crane arm in a static or in a dynamic state during transportation. The link member is suitable for performing a controlled rotation of the grabber together with the load around a substantially vertical geometric axis while performing a correct measurement despite inertial forces that occur during accelerating or decelerating of the load by rotating it around the vertical geometric axis.

For the purpose of understanding and interpretation of the present disclosure, the expression "substantially vertical geometric axis" means a geometric axis, which extends through the link member and is perfectly vertical when the grabber is freely hanging with the load, although during the practical use said grabber may be temporarily pivoted at a certain angle from the vertical axis, and in particular whenever the grabber along with the load is swiveled around the horizontal axis. Thus, the term "substantially vertical geometric axis" should be understood as to refer to an axis, which is located within the horizontal plane when the link member is maintained in position by the free hanging grabber, but can generally also be deflected from said horizontal plane during practical use, as a consequence of swinging the grabber together with the load.

A crane arm with a link member for operational accessory is disclosed in EP 1 889 808, wherein the rotating operational accessory, in particularly a grabber for gripping and transportation of timbers or other cylindrical solid objects, can be attached to the crane arm by means of said link member.

A link member as such is also described in EP 2 931 646 B1 may comprise two pivot joints, which are along spaced apart from each other along the vertical axis. These joints may include a top pivot joint, which is arranged on the side of the crane arm, and a bottom pivot joint, which is arranged on the side of the rotation unit on the operational accessory, wherein said pivot joints may be configured in a Cardan joint, wherein both pivoting axles thereof extend perpendicular to each other, around which the link member can be pivoted relative to the crane arm and the rotating unit. Furthermore, the bottom pivot joint of the link member is configured for establishing a pivotal interconnection between the link member and the rotating unit, and therefore presents an eye with a through hole, which passes in a direction of said pivoting axis of the bottom pivot joint and is configured to receive a bolt, while the top pivot joint is arranged on the side of the crane arm and is configured for establishing interconnection therewith, wherein said top pivot joint is created as a fork comprising two arms, which are spaced apart from each other and are each furnished with a bore therethrough, such that a bolt is insertable through these bores, which may be used to establish a connection with the crane arm.

Still further, a weighing apparatus for cranes is disclosed in CN 104 016 232 B, which comprises a carrying eye and a carrying hook, which are separated from each other in the vertical direction. The carrying eye is attached to the top attachment plate, while the hook is attached to the bottom attachment plate and the whole assembly is encased with a cover. Said carrying plates are connected through a sensor for measuring the extension resulting from the tension due to the weight of the load. A comparison weight is hung under the top carrying plate and comprises a sensor for measuring acceleration, which may be used to determine the weight of the load by comparing the displacement of the weight. Such a weight measuring apparatus ensures relatively accurate measurement results, however the result may be distorted due to the non-linear character of deformations and also due to friction hysteresis. In addition, devices for weighing loads during transportation thereof are also described in U.S. Pat. No. 9,000,311 B1, WO 2013/025141 A and in WO 2017/111684 A1.

A link member, which is suitable for connecting a grabber with a hydraulic crane arm and also for determination of the weight of the load during transportation of said load by means of a grabber, is described in WO 2019/009817 A1. Such a link member comprises two pivot joints, which are spaced apart from each other another in a direction along the vertical axis, namely a top pivot joint, which is arranged on the crane arm, and a bottom pivot joint, which is arranged on the side of a rotator or an operational accessory. Said pivot joints are designed as a Cardan joint, wherein their pivoting axles, around which the link member can be pivoted relatively to the crane arm or the rotator, are perpendicular to each other. The bottom pivot joint of the link member is configured to ensure a pivotal connection of the link member with the rotator and presents an eye with a bore therethrough, which extends in the direction of said pivoting axis of said bottom pivot joint and is configured to receive a bolt, which is configured to connect the link member and said rotator or grabber pivotally around said axis. The top pivot joint is arranged on the side of the crane arm and is suitable for establishing a connection therewith, wherein said top pivot joint is conceived as an eye and is furnished with a bore therethrough, which extends in the direction of said axis of the top pivot joint and is suitable for receiving a bolt, which serves to connect the link member and said crane arm pivotally around said axis. The bottom pivot joint is furnished with a prism-shaped section with a square cross-section, which extends coaxially with said central axis towards the top pivot joint and is on its terminal portion is configured with a threaded bolt, which is furnished with a centrally arranged blind bore, into which a screw is screwed. A first end portion of the screw has a left oriented thread and an opposite end portion of the screw has a right oriented thread. A compensating assembly is inserted between said top pivot joint and said bottom pivot joint of the link member and is formed by two groups of plates, wherein said groups are separated from each other by spacers. Each group consists of several plates, which are arranged in a sequence each above another and each of them is configured with a centrally arranged substantially square-shaped passage, which is adjusted to the shape and dimensions of said prism-shaped section on the bottom pivot joint of the link member, wherein each of said plates is furnished with a sequence of bores therethrough, which are arranged along its circumference and are spaced apart from each other, as well as with two longitudinal recesses, which are spaced apart from each other. Additionally, said plates in each group are alternatively arranged such that said recesses of each particular plate are oriented perpendicularly with respect to recesses on the neighboring plates located below and above it. Furthermore, said plates and said spacers are connected to each other by means of screws, which extend through said bores within the plates. A cover plate may be disposed above said compensating assembly and may be attached to the bottom pivot joint with a nut and washer, which are arranged on said threaded bolt on the prism-shaped section on the bottom pivot joint. Said screw protrudes through said cover plate towards the top pivot joint. A supporting plate is arranged above said cover plate and is firmly connected to said top pivot joint and furnished with two supporting members, which are spaced apart from each other and are arranged on the side of said top pivot joint symmetrically with respect to said central axis of the link member. A bending beam is configured to rest on said supporting members and is screwed to said supporting plate in two locations symmetrically with respect to said central axis. Said bending beam is uniform and comprises two supporting areas, which are arranged on said supporting plate and between which two arranged bridges are arranged, one above the other. These may include a thicker bottom bridge, which is furnished with a central through bore to accommodate a screw attached to the bridge with a nut, as well as a thinner and easily deformable top bridge, which may include two sensors attached to the external surface of the bridge facing towards the top pivot joint, which are suitable for detecting extensions and are arranged symmetrically with respect to the central axis. Two movement detecting sensors are also contemplated, wherein each of them includes both a sensor for detecting accelerations as well as a gyroscope. The first sensor is located in the area of said link member, namely in the area between the first point on said axis extending through the top pivot joint, and the second point, which is located on said axis extending through the bottom pivot joint and below said first point, while the second sensor is located in the area of said rotator at a sufficient distance from said second point on the axis extending through the bottom pivot joint of the link member. As mentioned above, a compensating assembly is disposed between the top pivot joint and the bottom pivot joint of the link member, which includes two groups of multiple plates, and groups are separated apart from each other by means of spacers. The presence of plates is important due to elimination of deformations in the transversal direction, which could have some impact on deformations in the longitudinal direction, which serve for determining of the weight of the load with the grabber hung on said link member. Such a configuration is suitable in most cases and the presence of said plates contributes to a significant improvement in the accuracy of determining the weight of the load during transportation. However, in situations when the link member is connected to a hydraulic rotator intended for enabling a controlled rotation of an attached grabber around a substantially vertical axis, namely around the geometric axis of the rotator, problems may occur. In particular, the alignment of the grabber may be perfectly vertical when the grabber is freely hanging with the load, but rotation of the grabber may cause deflection from said vertical axis at a certain angle, until the load together with the grabber is swiveling around at least one horizontal axis. Said rotator is intended for rotating each load around said substantially vertical axis and comprises a propulsion means, usually a hydraulic motor, which is capable of rotating the grabber with each load for a predetermined angle around said substantially vertical axis. The angular speed of the grabber with the load may vary, for example, the grabber with the load accelerates when transitioning from a standstill into rotation and correspondingly decelerates when slowing the rotation down. The acceleration and deceleration of the mass of the load and/or grabber results significant inertial forces, which results in torsion stresses within the link member acting in the transverse direction thereof, which can, especially by transporting of heavier loads, e.g. timbers, lead to slipping and shifting between plates. In particular, neighboring plates within the group may slip and turn relative to each other such that the shape of a group of plates may be transformed in its longitudinal direction into a helical shape. The warped shape of the plates of the compensation assembly may have significant influence in the weight measurement of each load, therefore the use of this type of link assembly design is not optimal.

The present disclosure generally refers to a link member on a crane arm which is suitable for weighing of a load and is on its one terminal area equipped with a first eye which is furnished with a bore therethrough, which extends in a direction along the first substantially horizontal geometric axis x, while on the remaining terminal area it is equipped with a second eye, which is furnished with a hole therethrough, which extends in a direction along the second substantially horizontal geometric axis y, which is perpendicular relative to said first substantially horizontal geometric axis x. Said eyes are firmly connected with each other via a central area, which is mechanically rigid and also elastically deformable, such that said link member is adapted to form a connection, which is freely pivotable around each of said horizontal axles x, y with the arm of the crane around said first horizontal axis x via a freely pivotable pivot joint as well as freely pivotable around said second horizontal axis y via a pivotable pivot joint with said grabber or a rotator, which is connected to the grabber and is adapted for enabling a controlled rotation of the grabber around the substantially vertical geometric axis z, wherein at least one sensor is installed in the elastically deformable central area of the link member and is suitable for detecting deformations of the link member, which are generated due to the weight of each load on the crane arm.

In accordance with the present disclosure it is proposed that said elastically deformable area together with said eyes forms a rigidly interconnected stirrup with a generally tubular shape, having an extensive internal passage, which has either a circular or a polygonal cross-section, which is symmetric with respect to said substantially vertical geometric axis z, wherein said internal passage includes two embedded elastically deformable lateral walls and extends along a substantially horizontal geometric axis x', which extends parallel to the geometric axis x, y of one of the said eyes. A measuring beam may be installed within the interior of said passage, at least approximately in the area of the longest distance between said walls, which is rigidly connected to each one of said opposite walls and is elastically deformable and stable in view of buckling at least in its longitudinal direction y' extending perpendicular to said longitudinal axis x' of the internal passage. The measuring beam comprises at least one flat surface, which extends in a direction of said longitudinal axis x', and onto which suitable sensors of the measuring assembly are attached, wherein said sensors are electrically connected with each other and are suitable for measuring extensions or contractions of said measuring beam in a direction of its longitudinal axis x', which result from elastic deformations of the central area due to relative displacement thereof due to changes in the relative distance between said lateral walls when the link member is exposed to stresses in a direction along said substantially vertical geometric axis z.

In this, said central internal passage in the elastically deformable central area of the link member is preferably a cylindrical through hole. In this case, the longitudinal axis y' of the measuring beam is arranged within a substantially horizontal plane of the cylindrical central passage in the central area of the link member.

In another embodiment of the present disclosure, each of said lateral walls in the central area of the link member around the internal passage has a flat external surface, wherein said flat surfaces on both opposite walls extend in a direction of said substantially vertical geometric axis z and are parallel to each other. Holes may be formed in the walls in the area of each of said flat surfaces extending coaxially with each other, such that the measuring beam is inserted through said holes and is rigidly connected with both opposite walls.

Said measuring beam is generally cylindrical, while said flat surface, which extends in a direction of the longitudinal axis x' of said measuring beam and is suitable for receiving said sensors, is formed by one of both opposite dominant surfaces of a flattened and weakened central area of the measuring beam, the cross-section of which is rectangular. In a preferred embodiment, said measuring beam has cylindrical areas on both ends, which are configured for inserting into said mutually coaxial holes within the opposite walls of said elastically deformable central area of the link member, and are additionally adapted for establishing a rigid mutual interconnection between each of said terminal areas of the measuring beam and each corresponding wall of the elastically deformable central area of the link member. Accordingly, this may produce two substantially semicircular (i.e., U-shaped) transverse recesses in profile between said central area and each corresponding terminal area when observed in a direction of said longitudinal directional axis y' on each side of said substantially flattened and weakened central area of the measuring beam. Each pair of opposite recesses, which are symmetrical with respect to said longitudinal geometric axis y', extend in a transversal direction with respect to said longitudinal geometric axis y' and simultaneously also in a direction which is perpendicular with respect to planes of both opposite dominant surfaces of said substantially flattened and weakened central area of the measuring beam in the area of its rectangular cross-section.

Said sensors, which are attached onto one of the opposite dominant surfaces of the weakened and significantly flattened central area of the measuring beam with said rectangular cross-section, are arranged such that the first pair of sensors, which are spaced apart from each other symmetrically with regard to the longitudinal geometric axis y', is configured for measuring extensions or contractions of said measuring beam along the plane in a direction of the longitudinal geometric axis y' thereof, while the remaining pair of sensors spaced apart along the longitudinal geometric axis y' symmetrically arranged sensors is configured for measuring extensions or contractions of said measuring beam within the same plane in a direction along its transversal geometric axis x', namely in a direction perpendicularly to the previously mentioned longitudinal geometric axis y'. Accordingly, both pairs of said sensors are electrically connected to form a Wheatstone bridge, which forms an integral part of the measuring unit, which is suitable for measuring forces which cause deformations of the measuring beam in the central area of the link member.

BRIEF DESCRIPTION OF THE DRAWINGS

The present disclosure will be described in more detail on the basis of embodiments and in relation with the attached drawings, in which.

DETAILED DESCRIPTION

Figures 1, 2, 3:
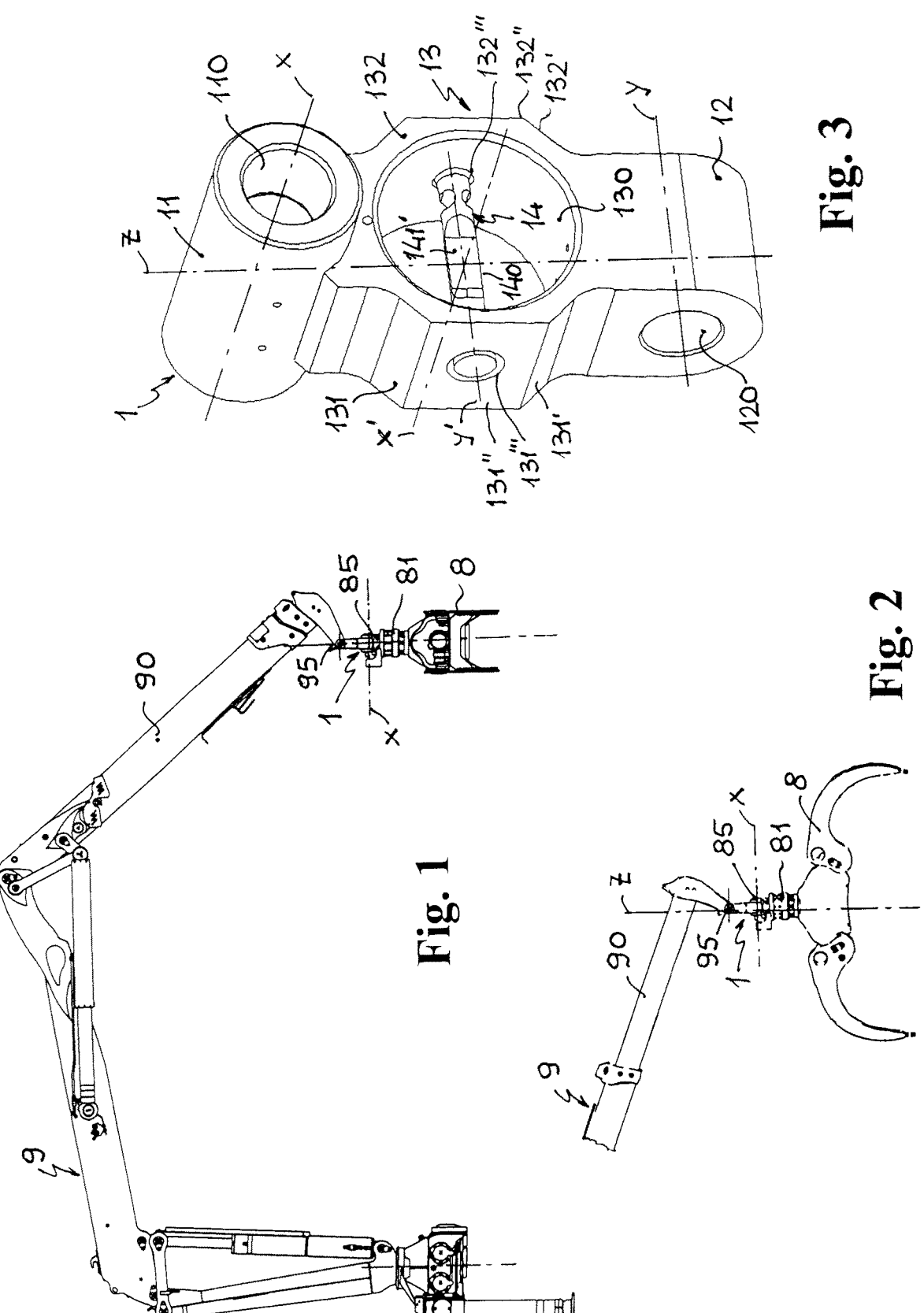
FIG. 1 presents a link member of a grabber installed on a mobile hydraulic crane between the telescopically extendable crane arm section and said rotatable grabber.
FIG. 2 shows a detailed presentation of application of the link member according to FIG. 1.
FIG. 3 shows an isometric view of a link member according to the present disclosure.
Figures 4, 5, 6:
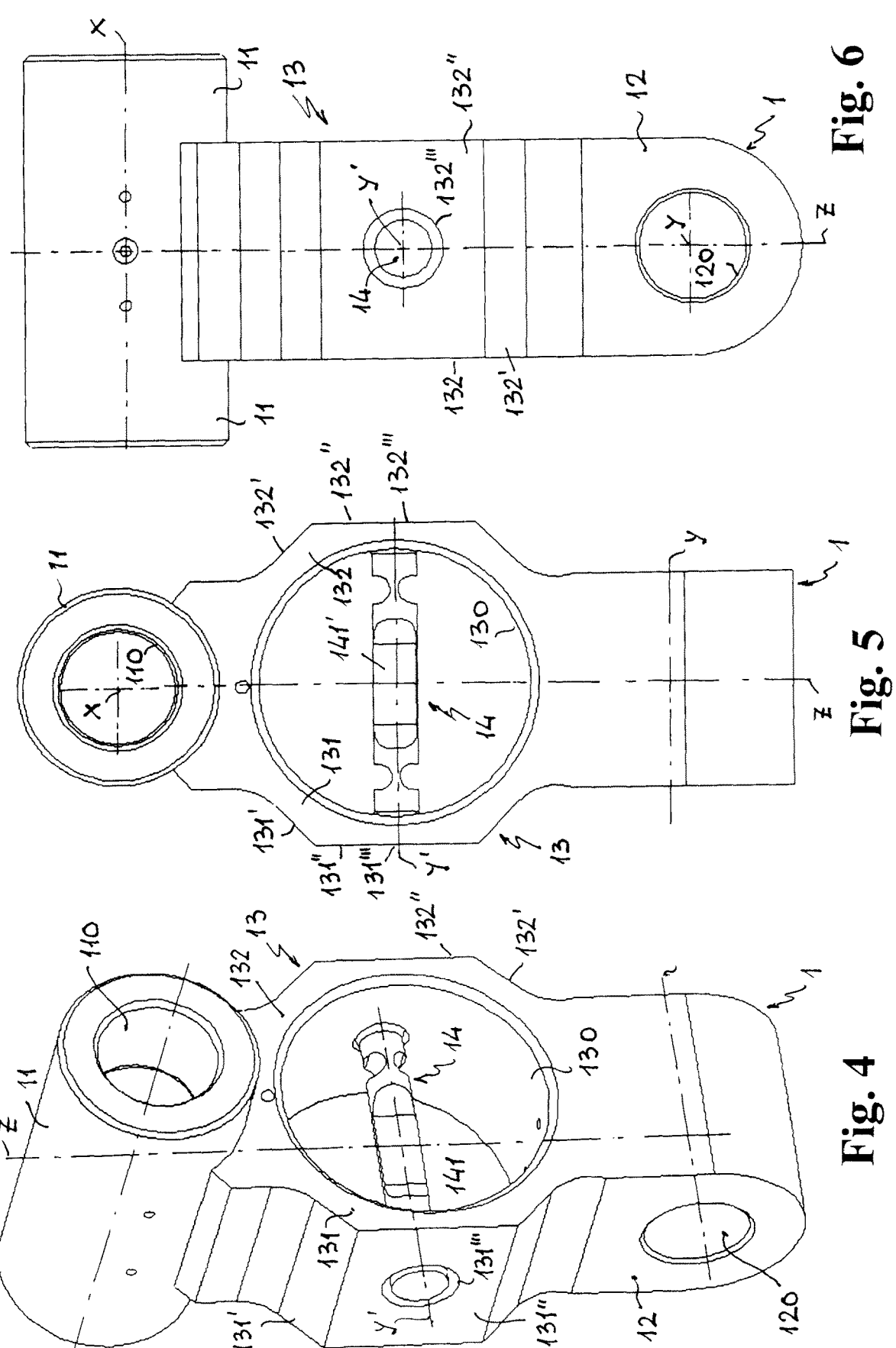
FIG. 4 similar to FIG. 3 shows an isometric view of a link member.
FIG. 5 shows a front view of a link member according to FIG. 3 or 4.
FIG. 6 shows a side view of a link member according to FIGS. 3-5.
Figures 7, 8, 9, 10, 11:
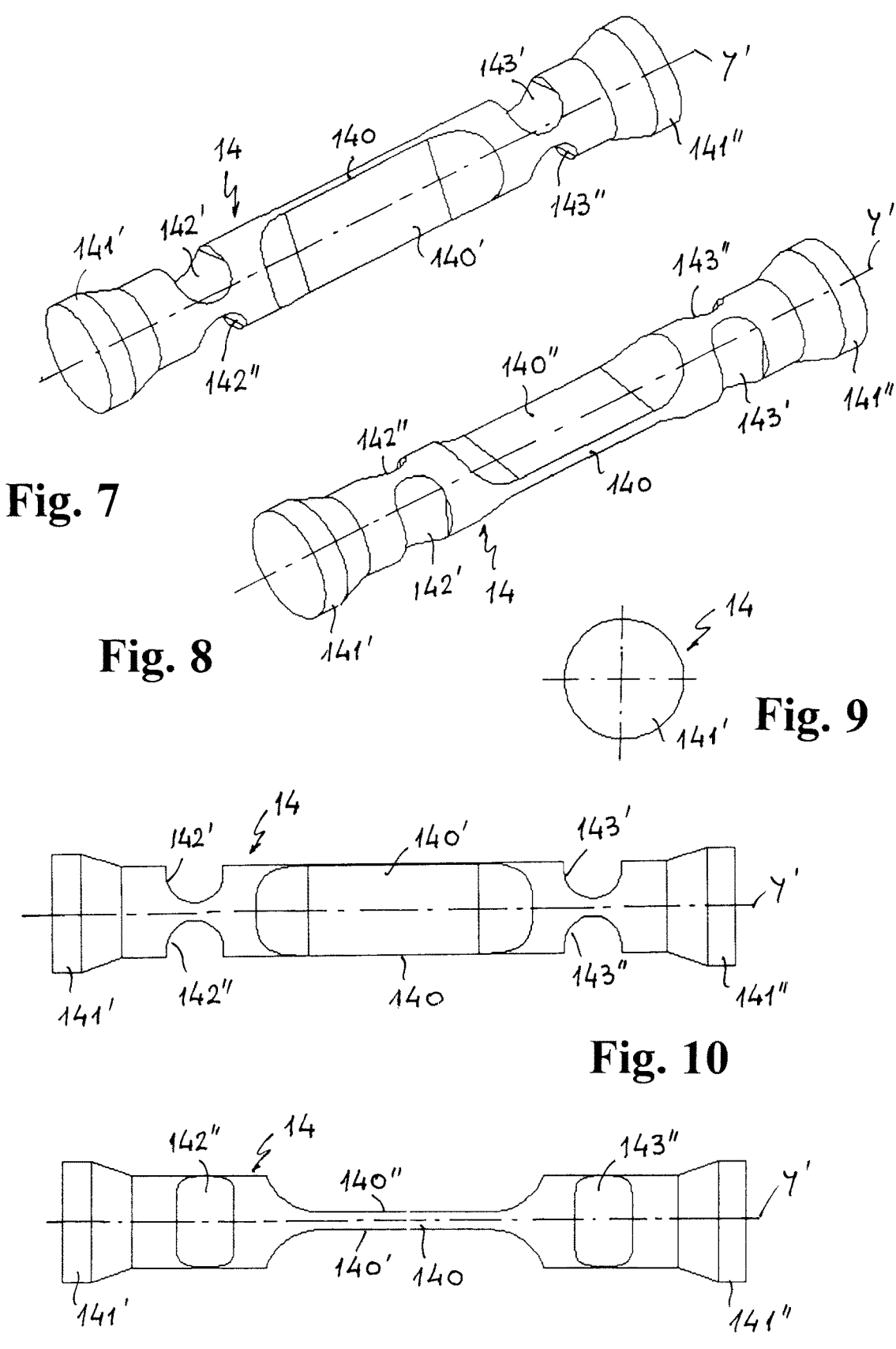
FIG. 7 shows an isometric view of a measuring beam.
FIG. 8 shows an isometric view of a measuring beam with a different observation angle.
FIG. 9 shows an orthogonal side view of a measuring beam.
FIG. 10 shows a front view of a measuring beam.
FIG. 11 shows a top view of a measuring beam.
Figure 12:
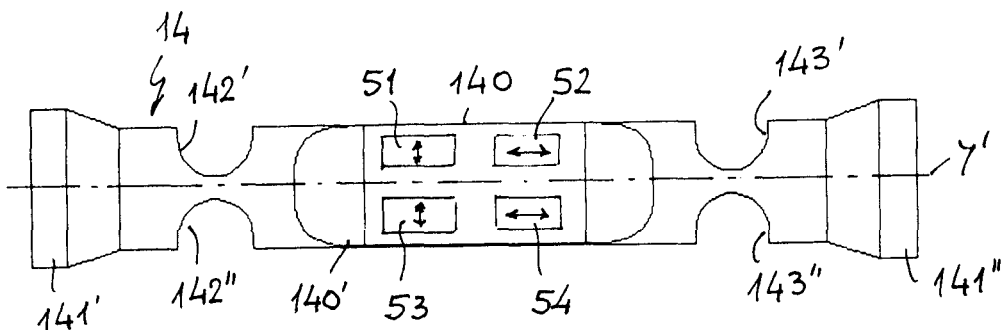
FIG. 12 shows a front view of a measuring beam with measuring gauges.
Figure 13:
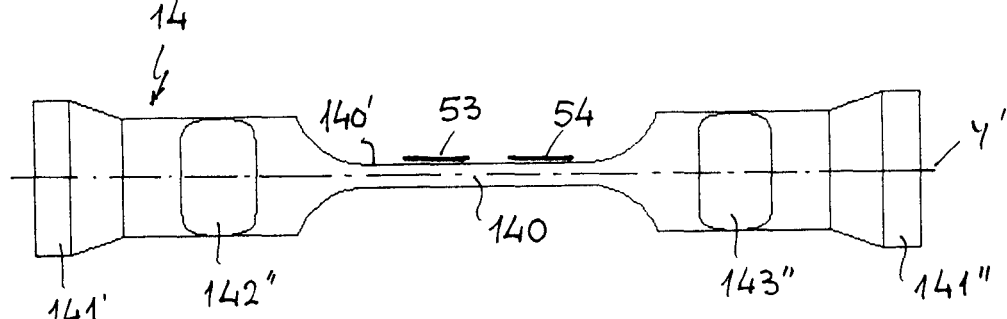
FIG. 13 shows a top view of a measuring beam with measuring gauges.

A link member 1, which is suitable for weighing loads and is located between a grabber 8 and an arm 90 on a crane 9, is shown on FIG. 1 in its ready-to-use state upon being mounted on the arm 90 of the crane 9. Moreover, said link member 1 is also shown on FIG. 2, in which said grabber 8 is turned by 90° around a substantially vertical geometric axis z relative to the position shown in FIG. 1 by a rotator 80.

A link member 1 without any electronic equipment as will be discussed in the forthcoming description, separately shown in FIGS. 3-6, is equipped with a first eye 11 furnished with a through hole 110 extending in a direction along the first substantially horizontal geometric axis x, and a second eye 12 furnished with a through hole 120, which extends in a direction along the second substantially horizontal geometric axis y, which is perpendicular with respect to said first substantially horizontal geometric axis x.

Said first eye 11, together with suitable eyes on said arm 90 of the crane 9 and a suitable bolt, forms a mechanical pivot joint 95, by means of which the link member 1 is connected to the arm 90 of the crane 9, enabling it to freely pivot around axis x. Second eye 12, together with at least one eye on the grabber 8 or on the rotator 80 of the arm 90 of the crane 9 and a suitable bolt, forms a mechanical pivot joint 85, by means of which the grabber 80 is connected to said link member 1 pivotally around said axis y via rotator 81, such that the link member 1 attaches the grabber 8 to the arm 90 of the crane 9. The grabber 8 is pivotable around both said substantially horizontal geometric axes x, y, which are perpendicular to each other, and is optionally rotatable around a substantially vertical geometric axis z via rotator 81.

Said eyes 11, 12 are firmly interconnected with each other through a central area 13, which is mechanically rigid as well as elastically deformable. The mechanical rigidity of said central area 13, and consequently of the link member 1, refers to its capability of withstanding long-term dynamic stresses to ensure the carrying capacity of the crane when a load, any attachment device, grabber 8, and optionally rotator 81 is hung on said link member 1. Furthermore, a controlled and measurable elastic deformability of the central area 13 is provided by the present disclosure.

Said link member 1 is configured to establish a connection between the arm 90 of the crane 90 and the grabber 8 or with rotator 81 connected to the grabber, such that the arm 90 is freely pivotable around each axis x, y via pivot joint 95, which is also adapted to perform a controlled rotation of the grabber 8 around said substantially vertical geometric axis z.

According to the present disclosure, said elastically deformable area 13, together with said eyes 11, 12, forms a rigidly interconnected tubular stirrup that is weakened by means of an extensive internal passage 130, the cross-section of which is circular or polygonal, and is symmetrical with regard to said substantially vertical geometric axis z. This internal passage 130 includes embedded elastically deformable lateral walls 131, 132 and extends along a substantially horizontal geometric axis x', which is parallel to the geometric axis x, y of the one of said eyes 11, 12. In addition, a measuring beam 14 is installed within this passage 130 at least approximately in the area of the longest distance between said lateral walls 131, 132, wherein said measuring beam 14 is firmly connected to each of said lateral walls 131, 132 and is elastically deformable and resistant to buckling at least in its longitudinal direction y', which extends perpendicular to said longitudinal axis x' of said throughout passage 130.

Said measuring beam 14 comprises at least one flat surface 140', which extends in a direction along said longitudinal axis x', such that suitable sensors 51, 52, 53, 54 of a measuring assembly 5 can be attached onto said flat surface 140', and are then electrically interconnected in order to measure extensions or contractions of said measuring beam

14 in a direction of its longitudinal axis x' which result from elastic deformations of the central area 13 due to displacement of lateral walls 131, 132 with respect to each other when said link member 1 is exposed to stresses in a direction along said substantially vertical geometric axis z.

Due to the deformable central area 13 with said central throughout passage 130 having elastically deformable walls 131, 132, the link member 1 may be tensioned to measure the relative distance between said lateral walls 131, 132 and corresponding contraction of the measuring beam 14 when exposed to compression stresses.

In a preferred embodiment according to FIGS. 3-6, said central internal passage 130 within said elastically deformable central area 13 of the link member 1 has a cylindrical through hole. In the shown embodiment, each of the lateral walls 131, 132 which surrounds said central throughout passage 130 in the central area 13 of the link member 1 includes a flat external surface 131", 132", wherein the flat surfaces 131", 132" on both walls 131, 132 extend in a direction along said substantially vertical geometric axis z parallel with each other. Accordingly, the longitudinal axis y' of the measuring beam 14 is arranged in a substantially horizontal plane of the cylindrical central passage 130 in the central area 13 of the link member 1. In this case, through holes 131''', 132''' may extend in each of said walls 131, 132 in the area of each of said flat surfaces 131", 132". These through holes 131''', 132''' in both lateral walls 131, 132 extend coaxially with each other. Due to this arrangement, said measuring beam 14 can be inserted through said holes 131''', 132''' and is rigidly connected with each of said lateral walls 131, 132.

A preferred embodiment of said measuring beam 14 is presented in FIGS. 7-13, in which said measuring beam 14 is generally cylindrical, while said flat surface 140', which passes in a direction along the longitudinal axis x' of said measuring beam 14 and is designed to receive said sensors 51, 52, 53, 54, is formed on the one of both opposite dominant surfaces 140', 140" of the significantly flattened and weakened central area 140 of the measuring beam 14 which has a rectangular cross-section.

Moreover, in the sense of the previously mentioned placement into said lateral walls 131, 132, said measuring beam 14 may have cylindrical terminal areas 141', 141" on each terminal end, which are configured for inserting into said coaxial holes 131", 132''' in the walls 131, 132 of the elastically deformable central area 13 of the link member 1 and also configured for establishing a rigid connection between each of said terminal area 141', 141" of the measuring beam 14 and each corresponding lateral wall 131, 132 of the elastically deformable central area 13 of the link member 1.

When determining weight by means of said link member 1, it is preferred that the measuring beam 14 is exposed exclusively to mechanical stresses acting along its longitudinal direction x', such as compression stresses, while any other potential stresses, like bending and torsion stresses, are eliminated. To this end, the preferred embodiment of said measuring beam 14 eliminates undesired impacts, which might result from complex distribution of stresses within said measuring beam 14 by deformation of said lateral walls 131, 132 of the central area 13 of said link member 1. To this end, when observed in the direction of its longitudinal geometric axis y', on each side of said significantly flattened and weakened central area 140 of the measuring beam 14 having a rectangular cross-section, there are two transversal recesses 142', 142"; 143', 143" which are semi-circular and U-shaped in profile and are located between said central area 140 and each corresponding terminal area 141', 141". Each of the two opposite recesses 142', 142"; 143', 143", which are symmetrical with regard to said longitudinal geometric axis y', extend in a transverse direction with respect to said longitudinal geometric axis y' and is moreover perpendicular to the planes of both opposing dominant surfaces 140', 140" of said significantly flattened and weakened central area 140 of the measuring beam 14 having a rectangular cross-section.

Figure 14:
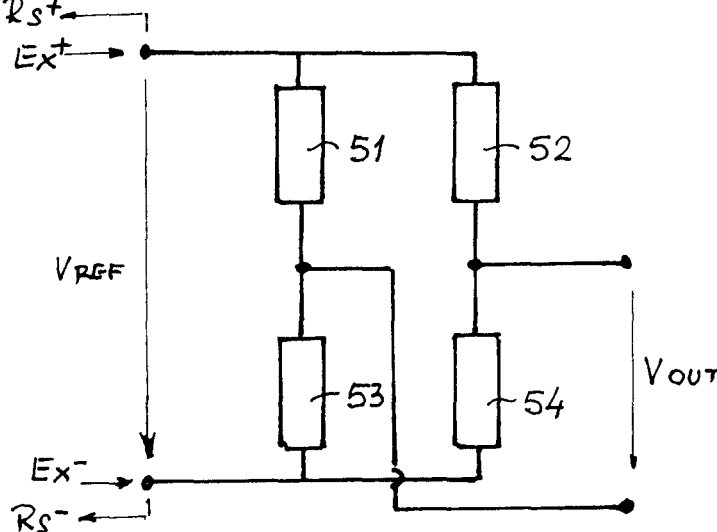
FIG. 14 shows a schematic of the electric interconnection of measuring gauges on said measuring beam.
Figure 16:
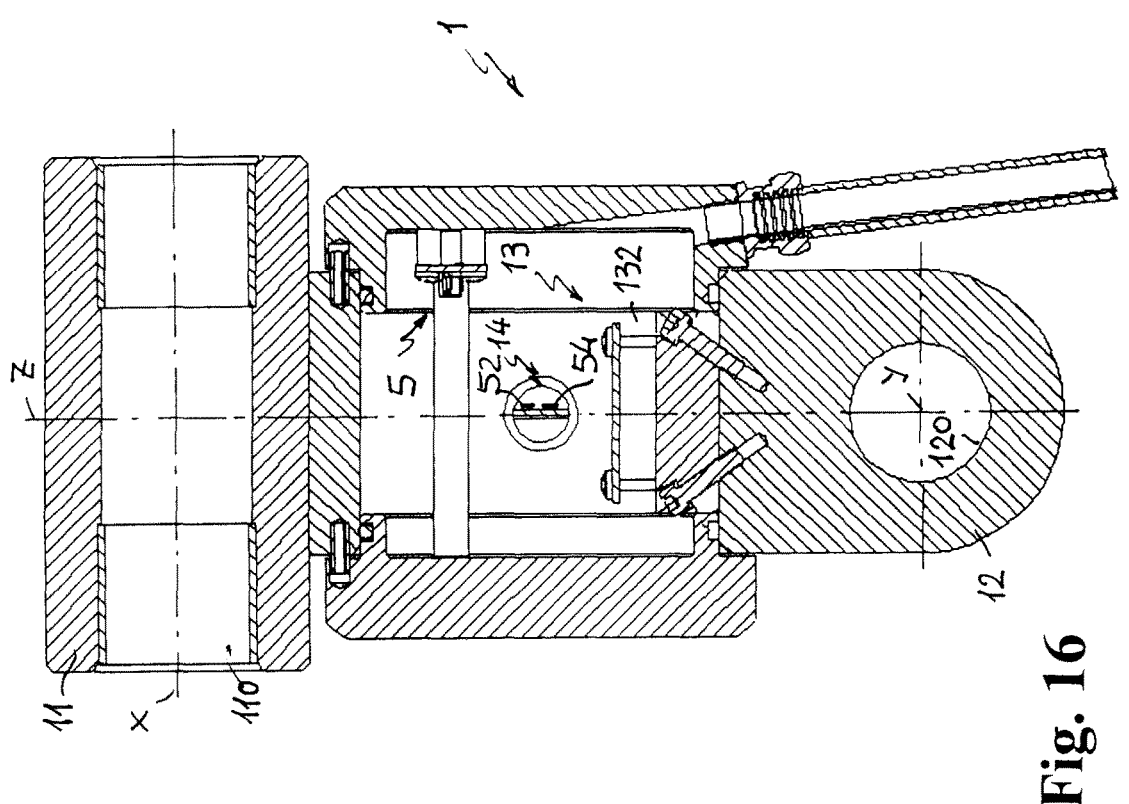
FIG. 16 shows a cross-sectional view along the longitudinal plane A-A of a measuring unit according to FIG. 15.
Figure 15:
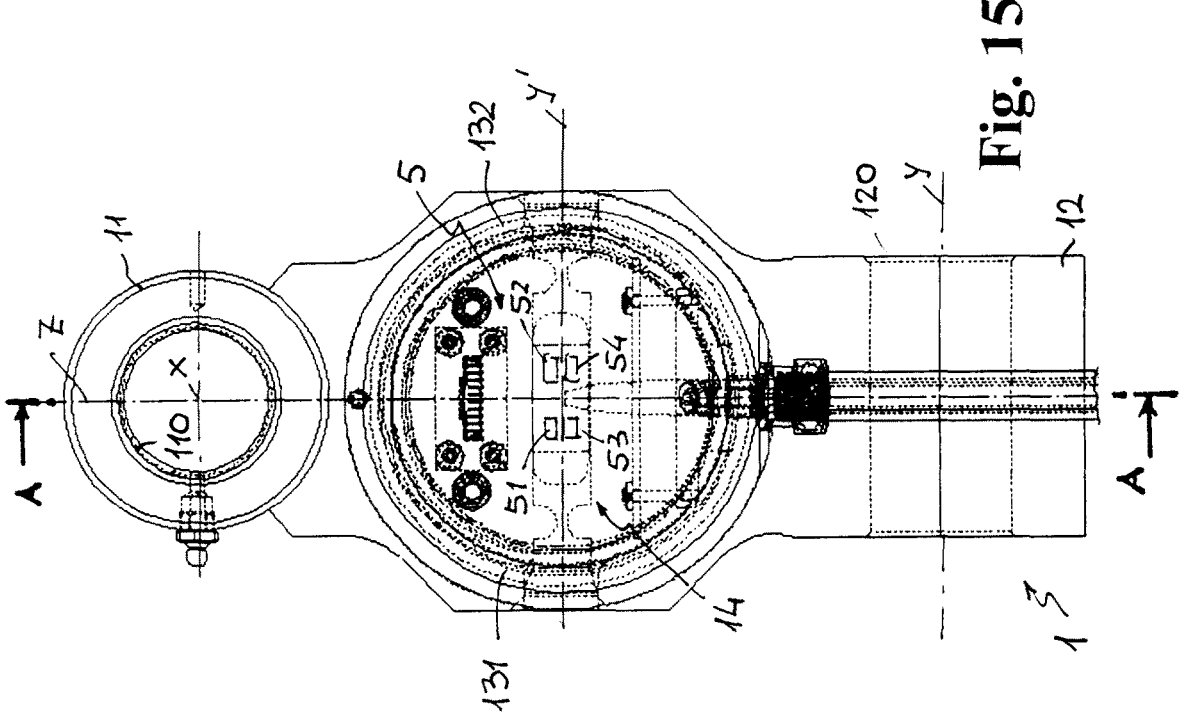
FIG. 15 shows a front view of a link member with a measuring beam, measuring gauges and corresponding electronic components.

Sensors 51, 52, 53, 54 may be used to measure deformations, in particular contractions of said measuring beam 14, which result from displacement of said lateral walls 131, 132 of the elastically deformable central area 13 of the link member 1. The sensors 51, 52, 53, 54 are placed onto just one of opposite dominant surfaces 140', 140" of said significantly flattened and weakened central area 140 of the measuring beam 14 having a rectangular cross-section, wherein said sensors 51, 52, 53, 54 are arranged in such a manner (FIGS. 12-14) that the first pair of sensors 51, 54 are spaced apart from each other and are arranged symmetrically with respect to the longitudinal geometric axis y' of said measuring beam 14 and adjusted for measuring extensions or contractions of said measuring beam 14 within said plane 141' and in a direction of its longitudinal geometric axis y', while the remaining pair of sensors 52, 53, which are also spaced apart and arranged symmetrically with respect to said longitudinal geometric axis y' is adjusted for measuring extensions and contractions of said measuring beam 14 also within the plane 141', however in a direction along the transverse geometric axis x' in a direction perpendicular to the longitudinal geometric axis y'. Both pairs of sensors 51, 54; 52, 53 are electrically interconnected to form a Wheatstone bridge (i.e. a so-called full-bridge strain gauge), which forms an integral part of the measuring unit 5.

In the example shown, said sensors 51, 54; 52, 53 are attached to said surface 141' of the measuring beam 14 by adhesive, and are interconnected in the previously described manner. Active resistor elements are configured for functioning as sensors 51, 54 and are capable of detecting the extension or contraction of said measuring beam 14 along the plane of said surface 141' and in its longitudinal direction along the geometric axis y'. Passive resistor elements are configured for functioning as reference sensors 52, 53 and are capable of measuring extensions or contractions of said measuring beam 14 within the same plane of said surface 141', however in the transverse direction, namely perpendicularly with respect to said longitudinal axis y', wherein the previously mentioned extensions or contractions may in fact be disregarded due to stresses which are acting on said measuring beam 14 in the central area 13 of the link member 1. Simultaneously with the extension or contraction of said measuring beam 14, sensors 51, 54 are also undergo extension or contraction along said geometric axis y', which results in changing of electrical resistance thereof, by which the change of electrical resistance in each sensor 51, 54 is linearly correlated with the change of the length of said measuring beam 14.

The relative change of the voltage across each resistor, namely sensor 51, 54, corresponds to the change in electrical resistance and consequently the change of the output voltage of said Wheatstone bridge is the sum of the voltage changes across both active sensors 51, 54. The sensitivity, which is enabled by such a circuit of sensors 51, 52, 53, 54 is consequently two times as large as in the case where only one active sensor is used.

The advantage of this concept of the interconnection of said sensors 51, 52, 53, 54 also results in the reduction of impact of external contact resistances, which would be unavoidable in the application of individual resistor sensors. Additionally, this concept provides that all sensors 51, 52, 53, 54 in this integrated version can be practically identical to each other. Since the changes in length of the measuring beam 14 are relatively small, the voltage differences between the reference voltage $V_{REF}$ and the output voltage $V_{OUT}$ are correspondingly small as well, which means that applying of a sensitive low-noise amplifier is generally recommended prior to analog-digital conversion. In order to enhance accuracy by measuring said changes in the length of the measuring beam 14, in the shown example, in addition to connectors $E_{X+}$, $E_{X-}$, a further pair of connectors $R_{S+}$, $R_{S-}$ is used for energizing said group of sensors 51, 52, 53, 54, wherein said pair of connectors $R_{S+}$, $R_{S-}$ is used to accurate measure the supply of a voltage (i.e. reference voltage $V_{REF}$) to the connectors.

For static weighing of a load, when it is hung on said arm 90 of said crane 9 and held by said grabber 8, the measurement of deformations of the measuring beam 14 within in the central area 13 of the link member 1 is sufficient.

In the case of dynamic weighing of the load during transportation, similar to the solution as disclosed in WO 2019/0009817 A, the measuring unit 5, in addition to said sensors 51, 52, 53, 54 on said measuring beam 14 in the central area 13 of said link member 1, also comprises at least two so-called EMU sensors, which are equipped with a gyroscope and are suitable for measuring accelerations during swinging of the load around said geometric axes x and y. In this case, the first sensor is installed in the area between both eyes 11, 12, namely in the area between said geometric axes x and y of the link member 1, while the second sensor is installed in the area of the grabber 8 or rotator 81. Consequently, the data received from sensors 51, 52, 53, 54 is read and acknowledged only in the case that the data received from said EMU sensors for detection of swinging of the load clearly show that the measurement is performed under regular conditions, which can be handled mathematically, within the framework of acceptable deviations.

What is claimed is:

1. A load weighing link member on a crane arm, comprising:
   - a first eye furnished with a first bore on a first terminal end, the first eye extending in a first direction along a first substantially horizontal geometric axis (x);
   - a second eye furnished with a second bore on a second terminal end, the second eye extending in a second direction along a second substantially horizontal geometric axis (y) which is perpendicular to said first substantially horizontal geometric axis (x), wherein said first and second eyes are firmly connected with each other via a central area which is mechanically rigid and elastically deformable;
   - a link member is adapted to form a connection which is freely pivotable around each of said horizontal axles (x, y), wherein link member is freely pivotable around said first horizontal axis (x) via a first pivot joint of the link member connected to the arm of the crane, wherein the link member is freely pivotable around said second horizontal axis (y) via a second pivot joint, wherein a grabber or rotator, which is connected to the grabber and is adapted for enabling a controlled rotation of the grabber around the substantially vertical geometric axis (z);
   - a plurality of sensors installed within an elastically deformable central area of the link member, wherein the plurality of sensors are suitable for detecting deformations of the link member which are generated due to the weight of a load held by the grabber hung on the arm of the crane, wherein said elastically deformable area together with said first and second eyes forms a rigidly interconnected stirrup, which is generally tubular and is weakened by an extensive internal passage which has either a circular or a polygonal cross-section, wherein the internal passage is symmetric with respect to said substantially vertical geometric axis (z), wherein said internal passage comprises two embedded elastically deformable lateral walls and extends along a substantially horizontal geometric axis (x'), which extends parallel to the geometric axis (x, y) of one of the first and second eyes;

a measuring beam disposed within the interior of said internal passage approximately in the area of the longest distance between said lateral walls, wherein the measuring beam is rigidly connected to both lateral walls in a section that is elastically deformable and stable in view of buckling at least in a longitudinal direction (y') extending perpendicularly to said longitudinal axis (x') of the internal passage, wherein said measuring beam comprises at least one flat surface, which extends in a direction of said longitudinal axis (x'), and onto which the plurality of sensors are attached, wherein the plurality of sensors are electrically connected with each other and are suitable for measuring extensions or contractions of said measuring beam in the direction of its longitudinal axis (x') resulting from elastic deformations of the central area due to varying distance between the lateral walls when the link member is exposed to stresses in a direction along said substantially vertical geometric axis (z).

2. The load weighing link member according to claim 1, wherein the central internal passage in the elastically deformable central area of the link member (1) is configured as a cylindrical through hole.

3. The load weighing link member according to claim 2, wherein the longitudinal axis (y') of the measuring beam is arranged within a substantially horizontal plane of the cylindrical central passage in the central area of the link member.

4. The load weighing link member according to claim 3, wherein each of the lateral walls in the central area of the link member comprises a flat surface extending in a direction of said substantially vertical geometric axis (z), wherein the flat surfaces are substantially parallel.

5. The load weighing link member according to claim 4, further comprising a through hole is disposed in each of said lateral walls in the area of each of the said flat surfaces, wherein said through holes extend coaxially wherein the measuring beam is inserted through said through holes and is rigidly connected with each one of the lateral walls.

6. The load weighing link member according to claim 5, wherein the measuring beam has a generally cylindrical shape, while said flat surface has a rectangular cross-section.

7. The load weighing link member according to claim 6, wherein both terminal ends of said measuring beam are adjusted for inserting into said coaxial through holes, wherein the terminal ends are further adapted for establishing a rigid connection to each lateral wall of the elastically deformable central area of the link member.

8. The load weighing link member according to claim 7, further comprising two transverse recesses that are substantially semicircular in profile and disposed between said central area and each corresponding terminal end, wherein the two transverse recesses are symmetrical with regard to said longitudinal geometric axis (y') and extend in the transverse direction with respect to said longitudinal geometric axis (y') and are also perpendicular with respect to planes of the substantially flattened and weakened central area of the measuring beam.

9. The load weighing link member according to claim 8, wherein a first set of said plurality of sensors is configured for measuring extensions or contractions of said measuring beam in a direction of the longitudinal geometric axis (y') thereof, wherein a second set of the plurality of sensors is configured for measuring extensions or contractions of said measuring beam in a direction along its transverse geometric axis (x'), wherein the first and second sets of said sensors are electrically connected to form a Wheatstone bridge of the measuring unit.

\* \* \* \* \*